United States Patent
Tsai

(10) Patent No.: US 8,956,733 B2
(45) Date of Patent: Feb. 17, 2015

(54) POWER TRANSMISSION BUS BAR FILLING MATERIAL

(75) Inventor: Ching Hsien Tsai, New Taipei (TW)

(73) Assignee: Taiwan Busway Co., Ltd., New Taipei (TW)

( * ) Notice: Subject to any disclaimer, the term of this patent is extended or adjusted under 35 U.S.C. 154(b) by 797 days.

(21) Appl. No.: 13/242,628

(22) Filed: Sep. 23, 2011

(65) Prior Publication Data

US 2013/0075653 A1   Mar. 28, 2013

(51) Int. Cl.
  *H01B 3/08* (2006.01)
  *H01B 7/28* (2006.01)
  *H02G 15/00* (2006.01)

(52) U.S. Cl.
  CPC .. *H01B 3/08* (2013.01); *H01B 7/28* (2013.01); *H02G 15/003* (2013.01)
  USPC ........................................................ 428/545

(58) Field of Classification Search
  USPC ........................................................ 428/545
  See application file for complete search history.

(56) References Cited

U.S. PATENT DOCUMENTS

2009/0266396 A1* 10/2009 Niira et al. .................... 136/244
2012/0040487 A1*  2/2012 Asthana et al. ................ 438/64

* cited by examiner

*Primary Examiner* — John Hardee
(74) *Attorney, Agent, or Firm* — Muncy, Geissler, Olds & Lowe, P.C.

(57) ABSTRACT

A filling material of power transmission bus bar, composed mainly of a silicone and an inorganic material, wherein weight ratio of said silicone and said inorganic material is between 1:0.1 and 1:9. As such, the resilience of the silicone can increase the buffering capability of said power transmission bus bar in facing pressure of strong winds; also stiffness of said inorganic material can increase the stability of said power transmission bus bar in a same situation. Said filling material of power transmission bus bar is able to protect metallic conduction element of said power transmission bus bar from getting in touch with moisture and dust, that may reduce its efficiency in transmitting power.

6 Claims, No Drawings

POWER TRANSMISSION BUS BAR FILLING MATERIAL

BACKGROUND OF THE INVENTION

1. Field of the Invention

The present invention relates to a filling material, and in particular to a filling material that can be filled into Power Transmission Bus Bar.

2. The Prior Arts

Due to the rapid growth and development of Industries, various big buildings, factories, or Hi-tech product manufacturers require enormous power supply to maintain and sustain their operations. Also, the demands for better environment protection, safety of working quarters are increasing. Therefore, the subjects of quality, stability, and safety of power supply are getting increasing attention. In case that power transmission problems occur during product manufacturing process, that could cause disruptions of normal operation of production lines, thus resulting great loss to the manufacturers.

Conventionally, power cables utilized in power transmission tend to generate large amount of heat, due to its small transmission cross section, and usually, the heat thus generated can not be dissipated in time, thus it is liable to incur accidents in power transmission, as such power cables are gradually replaced by power transmission Bus Bar, which has the advantages of being arranged according to the design of the building or the factory.

In the application of Power Transmission Bus Bar, the connection portions of two Bus Bars must be provided with water-proof equipment to prevent water from getting into the connection module in causing dangers. However, the water-proof structure utilized presently is a sealed case installed at the connection portions for their protection, yet the disadvantages are that, its water-proof is not quite effective, its structure is complicated and not easy to be installed, thus its assembly efficiency is rather low. As such, in addition to causing safety concerns, it may also cause inconvenience while performing periodic checking and maintenance for the connection portions of the Power Transmission Bus Bar. Meanwhile, in such a geographic environment of earthquake-prone island as Taiwan, in designing the connection structure of Power Transmission Bus Bar, it must taken into consideration that, in case of an earthquake, the structure of power transmission bus bar made of rigid material are not liable to be damaged in affecting safety and efficiency of power transmission. Moreover, when the power transmission bus bar is used for Wind Power Generation Plant, that generates power by means of wind, it must be assured that strong wind can not damage the connection portions of power transmission bus bar, as such raising safety of utilizing electric power.

Therefore, presently, the design and performance of power transmission bus bar of the prior art is not quite satisfactory, and it has much room for improvements.

SUMMARY OF THE INVENTION

In view of the problems and shortcomings of the prior art, the present invention provides a power transmission bus bar, so as to overcome the drawbacks effectively.

A major objective of the present invention is to provide a filling material, which is mainly composed of silicon and an inorganic material, wherein, the ratio of silicon and an inorganic material, is between 1:0.1 and 1:9, the ratio of the added inorganic material could affect the overall rigidity of the filling material, and silicon ratio could affect the resilience of the filling material. In one embodiment, the inorganic material is quartz, which is made by mixing uniformly quartz sand of various grain sizes. In another embodiment, the inorganic material further includes quartz powder. In a yet another embodiment, the inorganic material is composed of coarse quartz sand, fine quartz sand, quartz powder, and calcium carbonate, moreover, the filling material may include colored material.

In general, silicon is able to maintain stable and will not change its property in a temperature range between −40° C. and 200° C., such that it can be put and exposed outdoors without incurring aging, stiffening, breaking, or peeling. In addition, silicon tends to have excellent resilience after coagulation, thus it can achieve shock-proof effect. Furthermore, the mineral property of the silicon itself makes it insulation to electric conduction. On the whole, silicon has the advantages of good temperature stability, good weather change endurance, superior shock-proof capability, and excellent electric insulation. In addition, quartz sand is a hard, wear resistant, and chemically stable silicate mineral, meanwhile, it has good heat endurance. Therefore, when quartz sand is mixed with silicon, it can increase the stiffness and physical endurance of silicon without damaging resilience of silicon. As such, when the mixture of silicon and quartz sand is used as filling material for the power transmission bus bar, since the filling material can have both resilience and stiffness, such that in addition to being water-proof, moisture-proof, and electricity insulation, it can also raise the resistance and endurance to the strong outside physical forces such as strong winds and high pressures for the power transmission bus bar. Therefore, it can increase the suitability and adaptability of the power transmission bus bar to be used in the wind power generation system or platforms operating on the seas. Furthermore, such filling material can be removed, such as peeled off very easily from the power transmission bus bar for its maintenance or spare parts replacement.

The filling material mentioned above can be put in a sealed case at a junction of two the power transmission bus bars, so that such filling material may cover and wrap around the connection terminals of the power transmission bus bar, to prevent outside dust and moisture from contaminating the junction terminals in affecting the efficiency of power transmission.

Also, such filling material can be put onto the structure of main body of the power transmission bus bar, to encase the entire structure of the power transmission bus bar with mould, and fill the filling material in the gap between a plurality of electrical conductive components, and around their outer perimeters into the shape required. As such, through the addition of silicon to raise the resistance, endurance, and buffer of the entire bus bar against strong winds and high pressures, so as to prevent cracking or damages to the power transmission bus bar due to outside force.

Moreover, such filling material may also be used to the metallic protection housing of the power transmission bus bar, to encapsulate or wrap it around at least a electrical conduction element, and then put it into the metallic protection housing, so as to properly insulate the electrical conduction elements, to prevent the occurrence of short circuit between them.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

DETAILED DESCRIPTION OF THE PREFERRED EMBODIMENT

The purpose, construction, features, functions and advantages of the present invention can be appreciated and understood more thoroughly through the following detailed description with reference to the attached drawings.

In the following, preferred embodiments of the present invention are described in detail, in explaining various characteristics of the present invention.

Embodiment 1

In this embodiment, filling material poured into a sealing case at a junction portion of two power transmission bus bars is taken as an example, such that 1 unit weight of silicon is mixed uniformly with 0.07 unit weight of quartz. Wherein, the quartz material is formed by mixing coarse quartz sand, fine quartz sand, and quartz powder at ratio of 1:1:0.3 unit weight. Moreover, the filling material is further added with 0.03 unit weight of calcium carbonate and 0.039 percentage weight (wt %) of pigment, so as to form a glue type material after mixing them uniformly. Then, pour the glue type material into the sealed case to let it flow evenly around the connection terminals of the power transmission bus bar, and then coagulates into shape.

In this embodiment, the percentage of silicon added is greater than that of quartz, so after coagulation, the filling material could be more elastic, such that it can be peeled off and removed easily from the sealed case; also that is very convenient for maintenance staff in repairing the connection terminals of the power transmission bus bar and replacing its components.

Embodiment 2

In the present embodiment, filling material is applied to a power transmission bus bar, the entire structure of which is composed of a plurality of electric conduction elements, such that its main body is encased in a mold, and then fill in the filling material to form into shape, thus 1 unit weight of silicon is mixed uniformly with 7 unit weight of quartz. Wherein, the quartz material is formed by mixing coarse quartz sand, fine quartz sand, and quartz powder at ratio of 1:1:0.3 unit weight. Moreover, the filling material is further added with 2 unit weight of calcium carbonate and 0.039 percentage weight (wt %) of pigment, so as to form a glue type material after mixing them uniformly. Then, pour the glue type material into the mold encasing the bus bar main body, and after it coagulates, remove the mold to form the mold cast power transmission bus bar.

In this embodiment, the percentage of quartz added is greater than that of silicon, also more percentage of calcium calcite is added, therefore, the protection housing thus formed may have high degree of stiffness, and since the filling material still contains silicon, such that in the environment having strong winds, such as wind power electricity generator or platform operating on the sea, silicon still can provide the protection housing with buffering resilience to prevent it from cracking or collapse under the strong winds In the embodiments mentioned above, the quartz material utilized is not restricted to a single type of quartz, it can be chosen from coarse quartz sand, fine quartz sand, or quartz powder of various grain sizes, so that it can be used in a single type or a combination of various types at any ratio.

In testing various characteristics of the filling material of the present invention, firstly, put it in a heating furnace at 840° C. to heat it for 30 minutes, next measure its insulation resistance to be greater than 0.4 M ohm, then perform voltage endurance test with 1.5 KV/1 min, such that before the test, the power transmission bus bar having filling material mentioned above can be used to provide normal power supply, and have normal fire resistance, wear resistance, explosion proof, water-proof and shock-proof capabilities. In the heating test carried on at 840° C. in the heating furnace, power transmission bus bar can still continue providing normal power supply without incurring short-circuit condition. After completion of the test, the bus bar main body is still in crystallized block form, so that even the bus bar passes through a wall, and in case of fire, the fire will not spread to another room of the building. The characteristics mentioned above are all conform to the Specification of CNS 12514, JIS A1304 that after heating at 840° C., the power transmission bus bar will not short-circuited and catching fire.

Summing up the above, the filling material of power transmission bus bar of the present invention are capable of buffering capability of shock-proof or wind resistance, and stiffness characteristic, thus it can increase the wind resistance or shock-proof capabilities, when it is required to install the power transmission bus bar in a wind power electricity generation plant or platform on the sea. Meanwhile, it can protect the metallic conduction elements of power transmission bus bar from being contaminated by moisture and dust, that leads to deterioration of electricity transmission characteristics after long time of usage.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A filling material of power transmission bus bar, at least comprising:
   silicon, having addition amount of 1 unit weight; and
   inorganic material, having characteristics of high stiffness and with its addition amount of 0.1 to 9 unit weight, wherein said inorganic material is selected from a group consisting of: coarse quartz sand, fine quartz sand, quartz powder, and a mixture thereof.

2. The filling material of power transmission bus bar as claimed in claim 1, further comprising: calcium carbonate, with its addition amount of 0.03 to 2 unit weight.

3. The filling material of power transmission bus bar as claimed in claim 2, wherein said filling material is poured into a sealed case outside and around the connection terminals of two power transmission bus bars.

4. The filling material of power transmission bus bar as claimed in claim 2, wherein said filling material is poured to cover or wrap around the outer portion of at least a conduction element of said power transmission bus bar.

5. The filling material of power transmission bus bar as claimed in claim 2, wherein said filling material is used to make a precast power transmission bus bar main body.

6. The filling material of power transmission bus bar as claimed in claim 2, wherein in said filling material is further added a pigment.

\* \* \* \* \*